United States Patent
Hamaguchi et al.

(10) Patent No.: US 10,607,645 B1
(45) Date of Patent: Mar. 31, 2020

(54) DATA STORAGE DEVICE GENERATING PES RRO AND DATA SECTOR SQUEEZE RRO FOR A PLURALITY OF ZONES

(71) Applicant: Western Digital Technologies, Inc., San Jose, CA (US)

(72) Inventors: Takehiko Hamaguchi, Kanagawa (JP); Hiroshi Ide, Tokyo (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/456,242

(22) Filed: Jun. 28, 2019

(51) Int. Cl.
- *G11B 27/36* (2006.01)
- *G11B 5/596* (2006.01)
- *G11B 5/55* (2006.01)

(52) U.S. Cl.
CPC ........ *G11B 5/59688* (2013.01); *G11B 5/5552* (2013.01); *G11B 5/59655* (2013.01)

(58) Field of Classification Search
CPC ..... G11B 5/00; G11B 20/10009; G11B 27/36; G11B 20/12; G11B 5/52; G11B 5/56; G11B 5/58
See application file for complete search history.

(56) References Cited

U.S. PATENT DOCUMENTS

| | | |
|---|---|---|
| 6,657,810 B1 | 12/2003 | Kupferman |
| 6,707,635 B1 | 3/2004 | Codilian et al. |
| 6,735,033 B1 | 5/2004 | Codilian et al. |
| 6,950,967 B1 | 9/2005 | Brunnett et al. |
| 7,457,075 B2 | 11/2008 | Liu et al. |
| 7,626,782 B1 | 12/2009 | Yu et al. |
| 7,653,847 B1 | 1/2010 | Liikanen et al. |
| 7,929,234 B1 | 4/2011 | Boyle et al. |
| 7,961,422 B1 | 6/2011 | Chen et al. |
| 8,619,381 B2 | 12/2013 | Moser et al. |
| 8,625,224 B1 | 1/2014 | Lin et al. |
| 8,693,134 B1 | 4/2014 | Xi et al. |
| 8,699,172 B1 | 4/2014 | Gunderson et al. |
| 8,736,995 B1 * | 5/2014 | Wiesen ............ G11B 5/59694 360/27 |
| 8,854,751 B2 | 10/2014 | Rub |
| 8,867,153 B1 | 10/2014 | Coker et al. |
| 8,988,810 B1 | 3/2015 | Liew et al. |
| 9,026,728 B1 | 5/2015 | Xi et al. |
| 9,230,605 B1 | 1/2016 | Moser et al. |
| 9,378,763 B1 | 6/2016 | Kim et al. |
| 9,934,871 B2 | 4/2018 | Squires |
| 10,056,109 B2 | 8/2018 | Liu et al. |

(Continued)

OTHER PUBLICATIONS

Bill Boyle, Curtis E. Stevens "Realms API", T10 Technical Committee, Oct. 31, 2017, http://www.t10.org.

*Primary Examiner* — Nabil Z Hindi

(57) ABSTRACT

A data storage device is disclosed comprising a head actuated over a disk comprising servo data for defining a plurality of data tracks. A plurality of zones are defined for the disk, wherein each zone comprises a plurality of the data tracks. Position error signal (PES) repeatable runout (RRO) values are generated based on the servo data in a first zone, and data sector squeeze RRO values are generated based on data segments in the first zone. A first data track format for the first zone is generated based on the PES RRO values, and a second data track format is generated for the first zone based on the data sector squeeze RRO values.

20 Claims, 15 Drawing Sheets

(56) References Cited

U.S. PATENT DOCUMENTS

| | | |
|---|---|---|
| 10,192,570 B2 | 1/2019 | Kawabe et al. |
| 2012/0162806 A1 | 6/2012 | Champion et al. |
| 2012/0307400 A1 | 12/2012 | Kawabe |

* cited by examiner

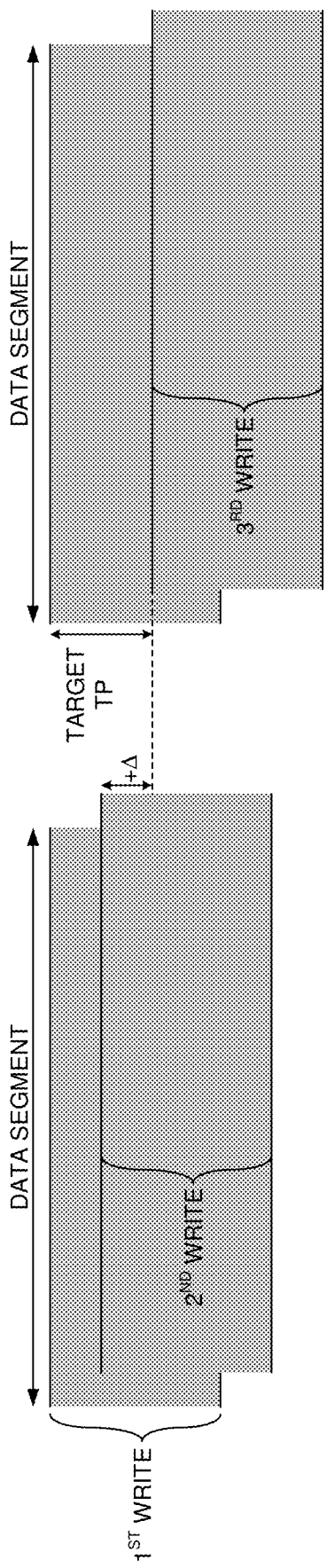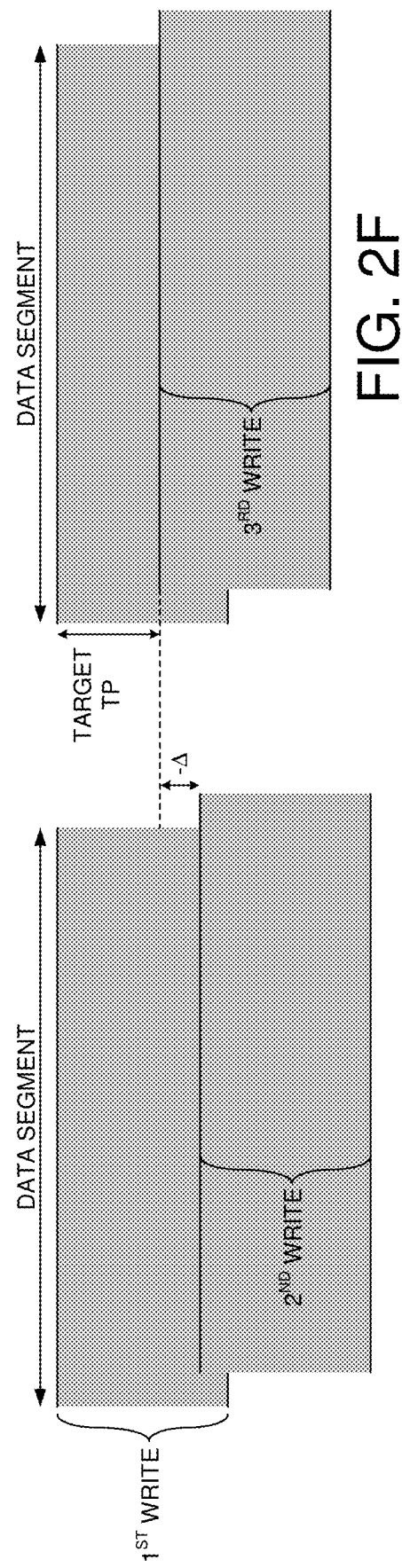

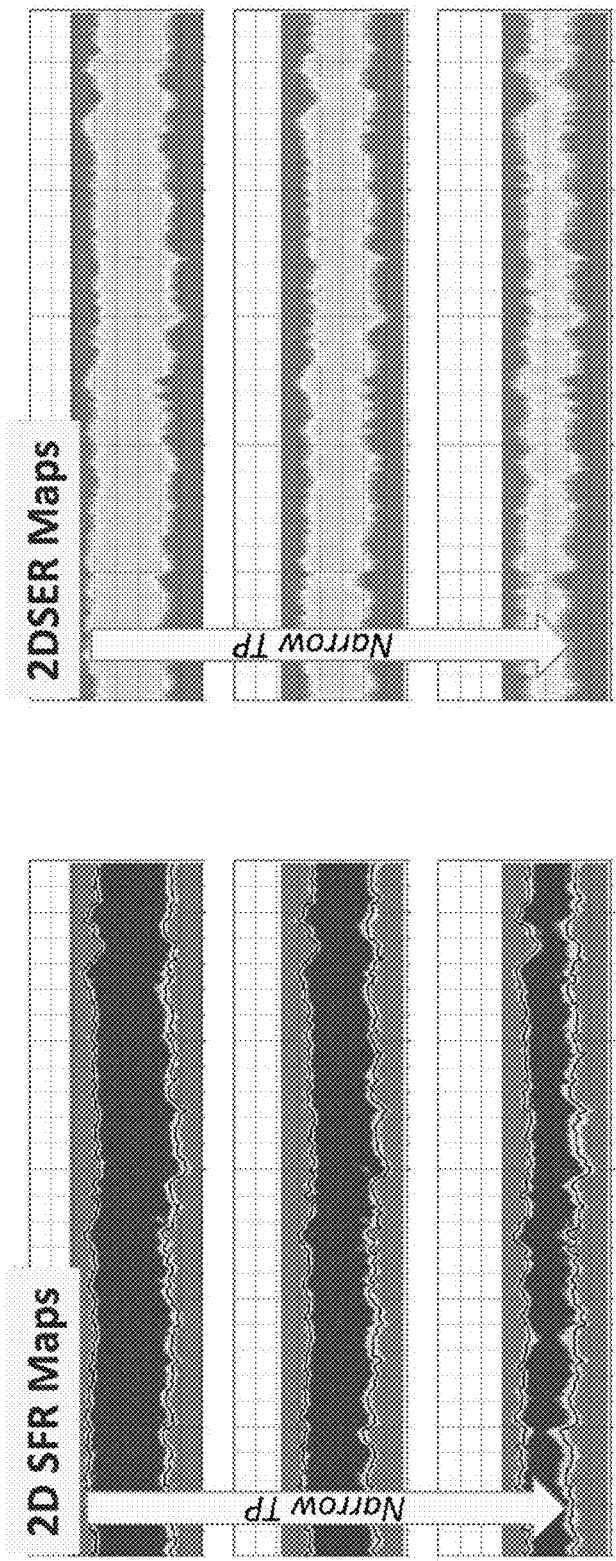
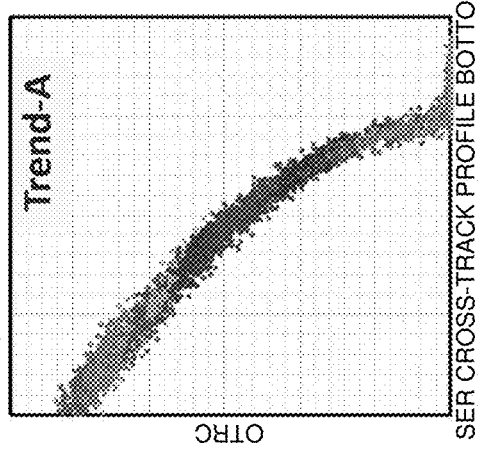
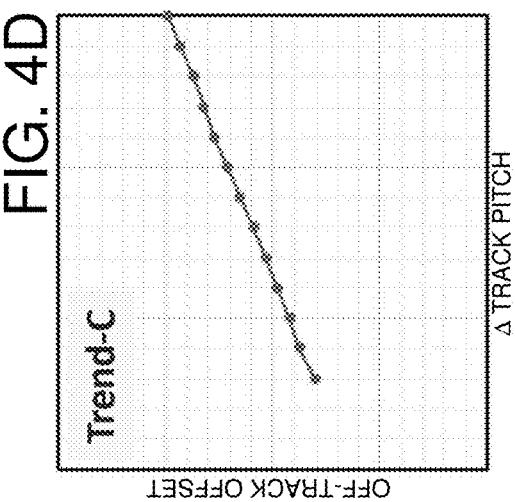
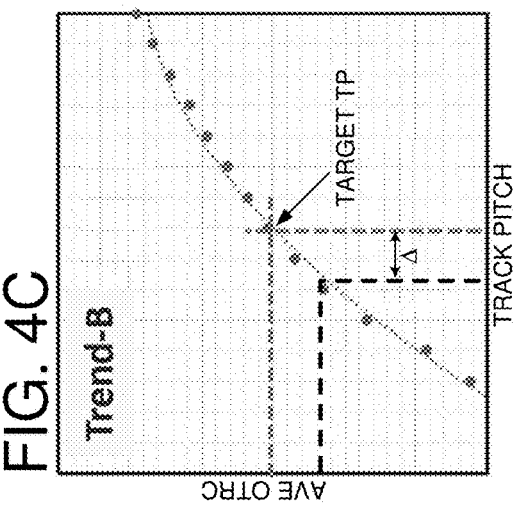

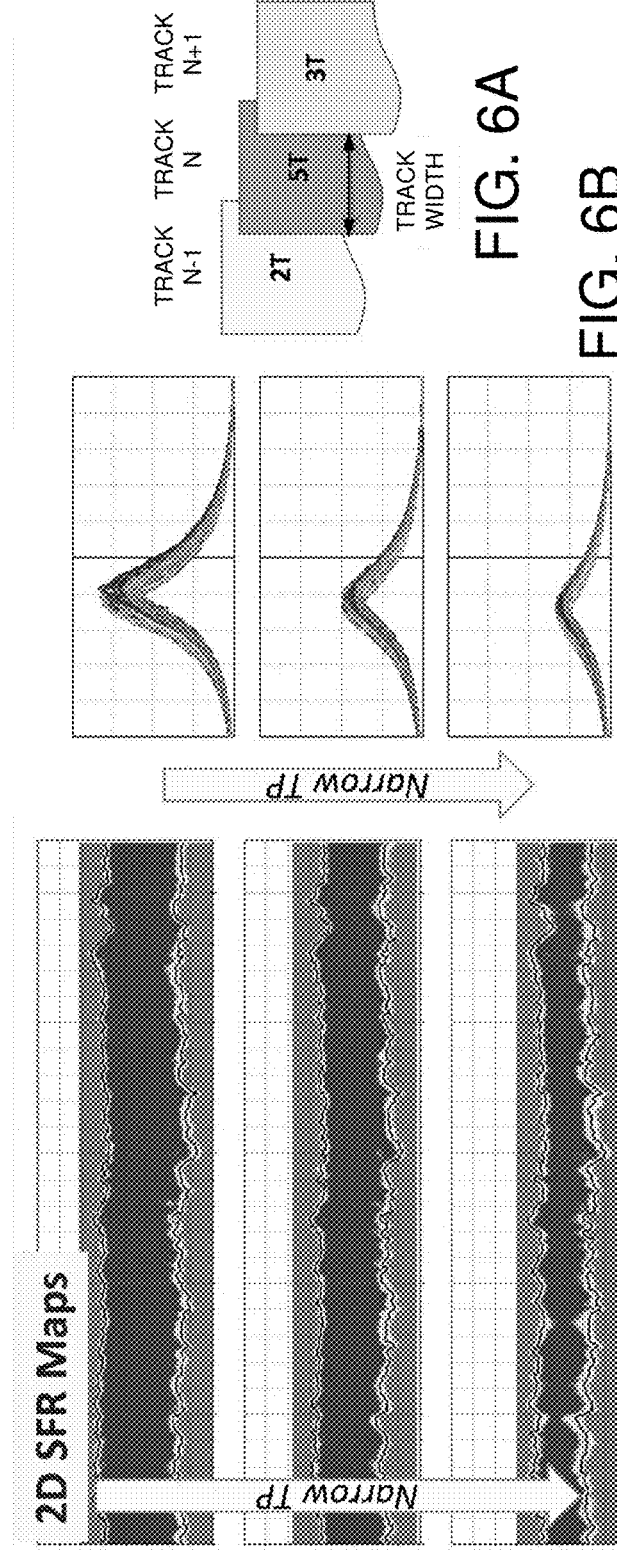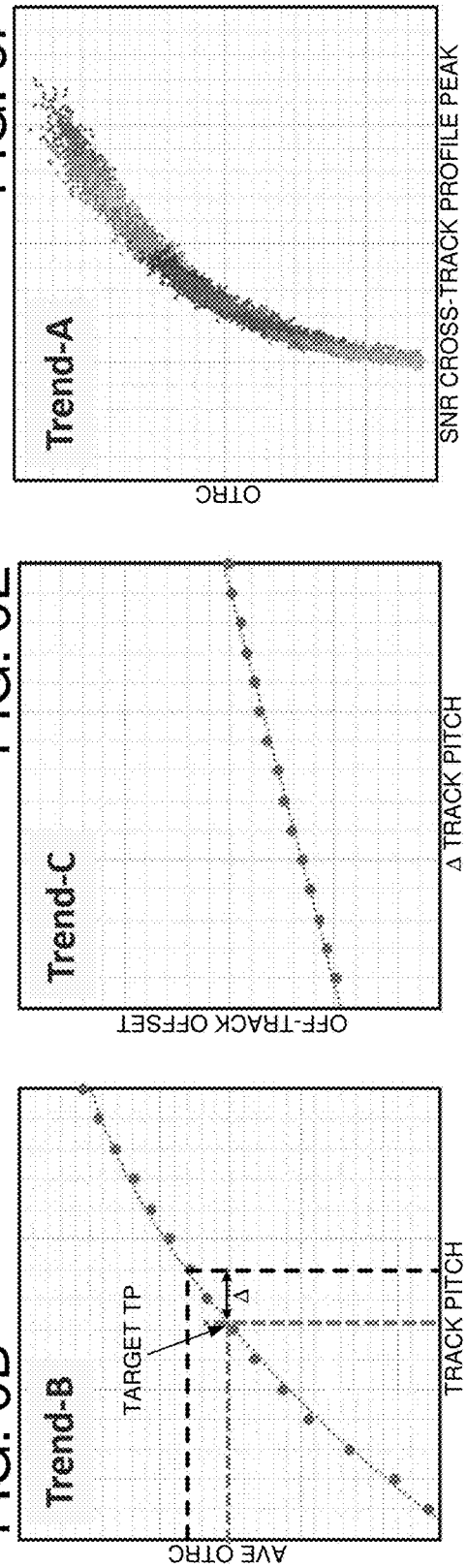

| Step | Track # 0 | Track # 1 | Track # 2 | Track # 3 | Track # at which Track Trajectories are determined |
|---|---|---|---|---|---|
| 1 | Write Test Pat. | | | | |
| 2 | | Write Dummy Pat. | | | |
| 3 | Measure CT Profile | | Preparation Step for Track #0 | | 0(Read) / 1(Write) |
| 4 | | Write Test Pat. | | | |
| 5 | | | Write Dummy Pat. | | |
| 6 | | Measure CT Profile | | | 1(Read) / 2(Write) |
| 7 | Write Cust. Data | | Write Test Pat. | | |
| 8 | | Write Customer Data on Track #0 | | Write Dummy Pat. | |
| 9 | | | Measure CT Profile | | 2(Read) / 3(Write) |
| 10 | | Write Cust. Data | | | |
| 11 | | | | | |

FIG. 8

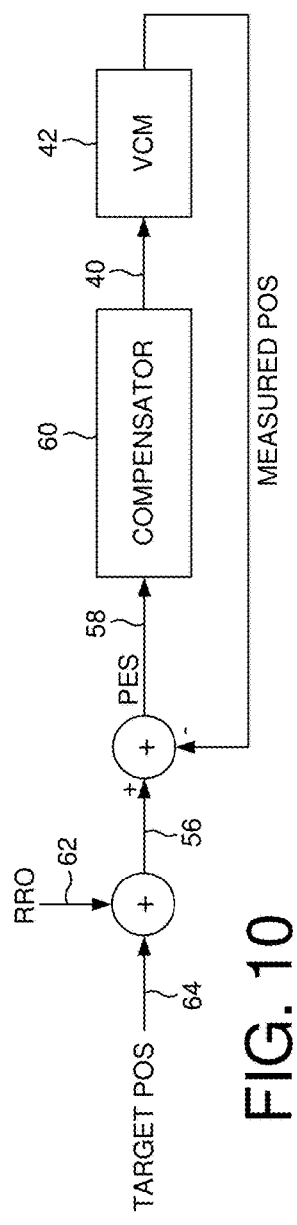
FIG. 10
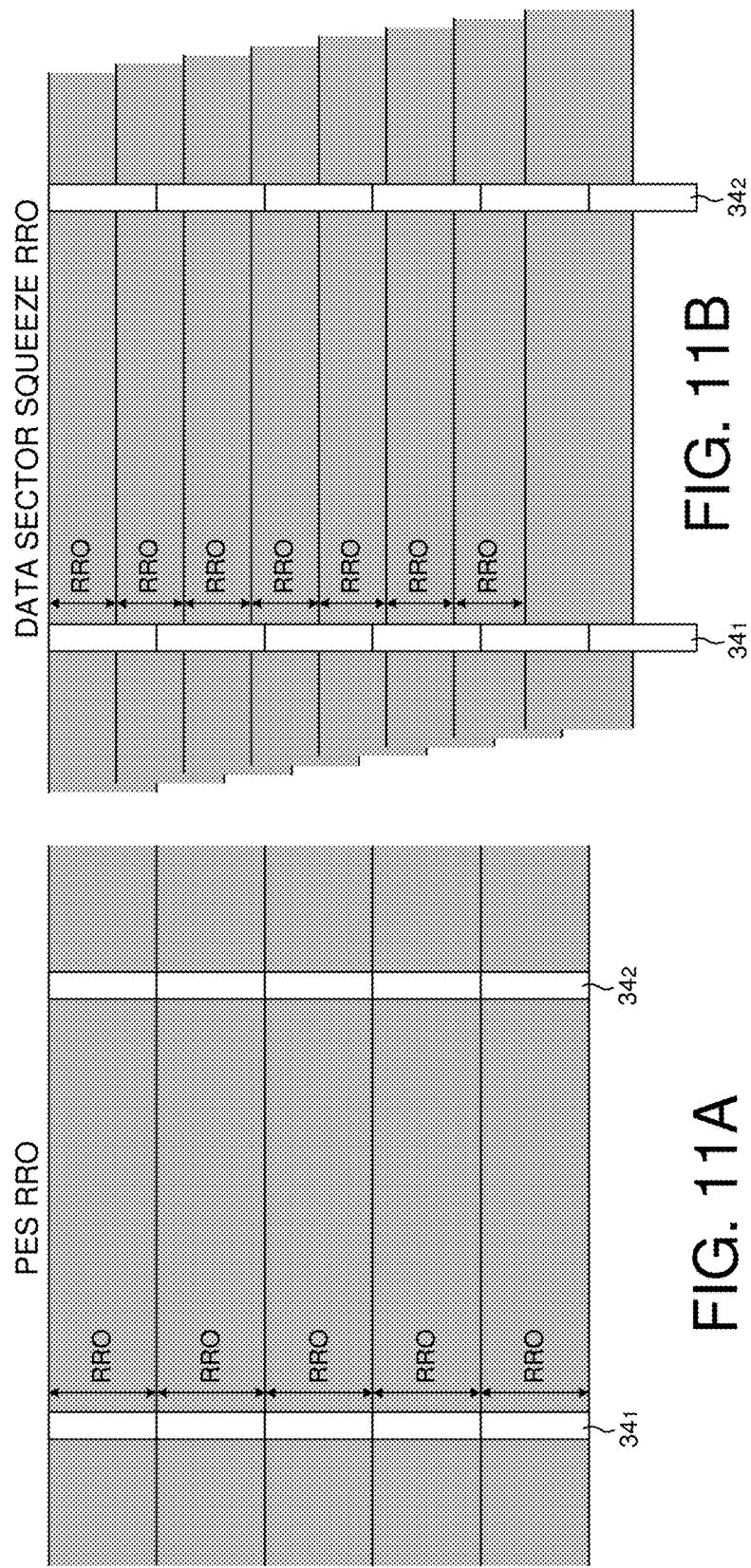
FIG. 11B
FIG. 11A

DATA STORAGE DEVICE GENERATING PES RRO AND DATA SECTOR SQUEEZE RRO FOR A PLURALITY OF ZONES

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2C shows an embodiment wherein the data tracks are written with an overlap in a technique referred to as shingled recording.

FIG. 2D shows an embodiment wherein the track trajectory for a target data track is generated by measuring a delta (A) between a measured track pitch and a target track pitch for multiple data segments around the target data track.

FIGS. 2E and 2F show an embodiment wherein the delta (A) between the measured track pitch and a target track pitch for a data segment may be negative (meaning the measured track pitch is greater than the target track pitch).

FIGS. 4A-4E show an embodiment wherein the quality metric for generating the cross-track profile is an error rate of the data segment.

FIGS. 6A-6F show an embodiment wherein the quality metric for generating the cross-track profile is a signa-to-noise (SNR) of the data segment.

FIG. 8 shows an embodiment wherein the track trajectory of a target data track is measured as part of a write operation when writing user data to the target data track.

FIG. 10 shows a closed loop control system for controlling a VCM while accessing a data track, wherein repeatable runout (RRO) values are used to define the track trajectory of the target data track.

FIGS. 11A and 11B show an embodiment wherein for a radial band of data tracks PES RRO values may be used when the data tracks are non-shingle written, and data sector squeeze RRO values may be used when the data tracks are shingle written.

DETAILED DESCRIPTION

Figure 2A:
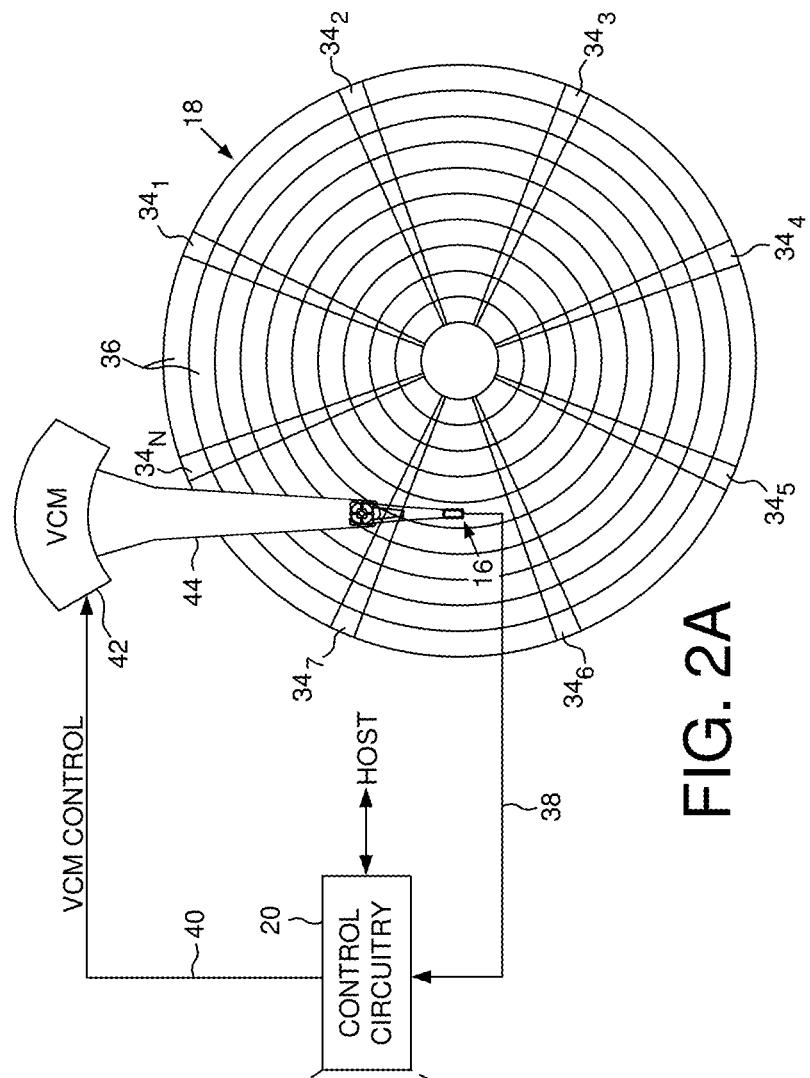
FIG. 2A shows a data storage device in the form of a disk drive according to an embodiment comprising a head actuated over a disk.
Figure 2B:
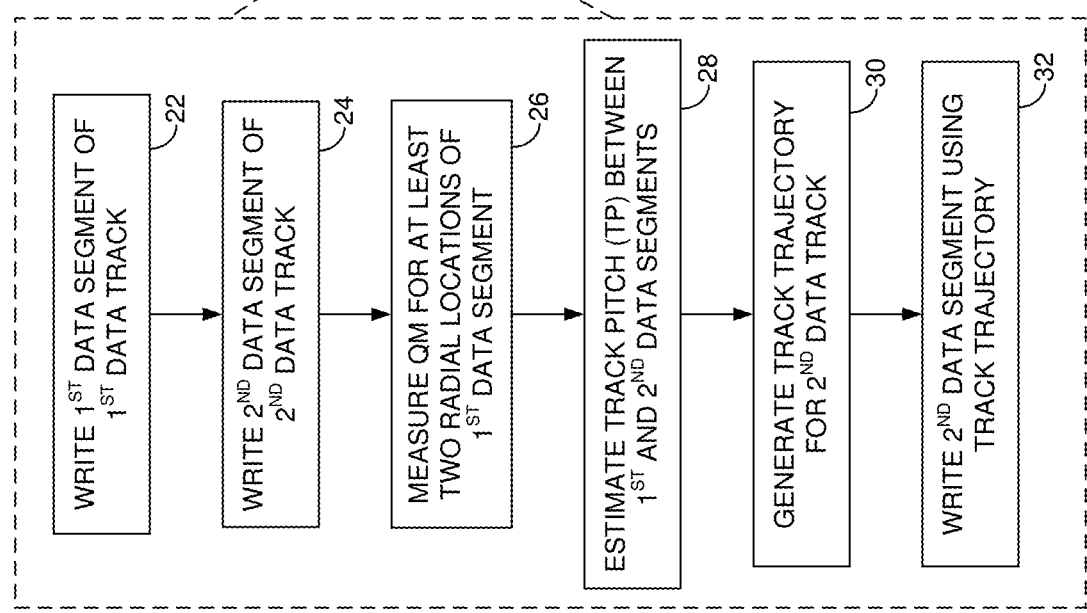
FIG. 2B is a flow diagram according to an embodiment wherein a track trajectory is generated for a target data track based on a measured track pitch of a data segment.

FIG. 2A shows a data storage device in the form of a disk drive comprising a head 16 actuated over a disk 18 comprising servo data for defining a plurality of data tracks, wherein each data track comprises a plurality of data segments. The disk drive further comprises control circuitry 20 configured to execute the flow diagram of FIG. 2B, wherein first data is written to a first data segment of a first data track (block 22), and second data is written to a second data segment of a second data track (block 24) such as shown in FIG. 2C. After writing the second data, a quality metric for at least two off-track offsets of the first data segment is measured (block 26), and a track pitch is estimated between the first data segment and the second data segment based on the quality metrics (block 28). A track trajectory is generated for the second data segment based on the estimated track pitch (block 30), and third data is written to the second data segment based on the track trajectory (block 32) such as shown in FIG. 2D or FIG. 2F.

Figure 1:
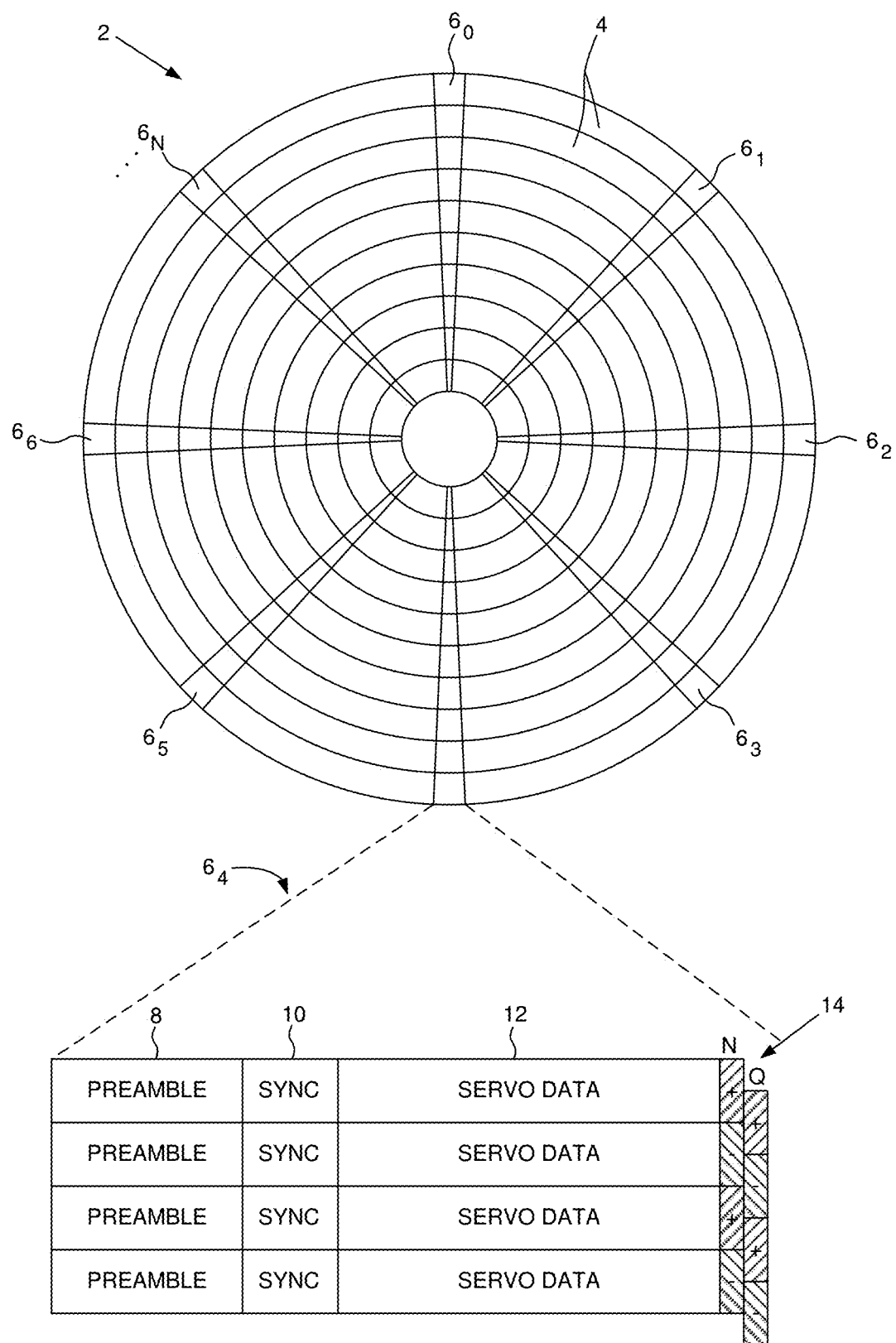
FIG. 1 shows a prior art disk format comprising a plurality of servo tracks defined by servo sectors.

In the embodiment of FIG. 2A, the disk 18 comprises a plurality of servo sectors $34_1$-$34_N$ that define a plurality of servo tracks 36, wherein data tracks are defined relative to the servo tracks 36 at the same or different radial density. The control circuitry 20 processes a read signal 38 emanating from the head 16 to demodulate the servo sectors and generate a position error signal (PES) representing an error between the actual position of the head and a target position relative to a target track. A servo control system in the control circuitry 20 filters the PES using a suitable compensation filter to generate a control signal 40 applied to a VCM 42 which rotates an actuator arm 44 about a pivot in order to actuate the head radially over the disk surface in a direction that reduces the PES. In one embodiment, the head 16 may be actuated over the disk 18 based on the PES using one or more secondary actuators, for example, a microactuator that actuates a suspension coupling a head slider to the actuator arm 44, or a microactuator that actuates the head slider relative to the suspension (e.g., using a thermal actuator, piezoelectric actuator, etc.). The servo sectors $34_1$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the data tracks are written in a consecutive order (e.g., from an outer diameter toward an inner diameter) with a predetermined overlap, such as shown in FIG. 2D or FIG. 2F, in a technique referred to as shingled recording. Conventionally the shingled data tracks are written with sufficient spacing (track pitch) so as to compensate for the worst case AC track squeeze that may occur around the circumference of a data track. However, compensating for the worst case AC track squeeze may lead to a larger than necessary track pitch for a significant number of data segments (e.g., data sectors) around the circumference of each data track. That is, adding a margin into the target track pitch in order to compensate for the worst case AC track squeeze in shingled recording reduces the maximum capacity of the disk drive. Accordingly, in one embodiment the track pitch for each data segment around the circumference of a data track is estimated in order to generate a track trajectory, wherein the track trajectory is used to write each data segment so as to substantially achieve a target track pitch around the circumference of the data track (i.e., reduce the amplitude of the AC track squeeze). This enables a significant reduction in the margin conventionally added to the target track pitch in shingled recording, thereby increasing the radial density of the data tracks and overall capacity of the disk drive.

Referring again to FIG. 2C or FIG. 2E, in one embodiment the uncompensated track pitch for a data segment of a first data track is estimated by writing a first test pattern to the first data segment, and then shingle writing a second data segment of a second data track (adjacent the first data track) based on an uncompensated track trajectory (e.g., no repeatable runout (RRO) compensation). The uncompensated track pitch is then estimated, for example, using an embodiment described below, thereby generating a delta ($\Delta$) between the uncompensated track pitch and a target track pitch of the first data segment (positive as shown in FIG. 2C or negative as shown in FIG. 2E). In one embodiment, this measured delta ($\Delta$) is converted into a track trajectory (e.g., in the form of RRO compensation values) for writing data to the second data segment, thereby achieving the target track pitch for the first data segment as shown in FIG. 2D or FIG. 2F. This process is then repeated for the second data segment in order to generate a track trajectory used to write the next, adjacent data segment of the next adjacent data track, and so on, thereby propagating the track trajectories of shingled data tracks across at least part of the disk surface.

Figure 3A:
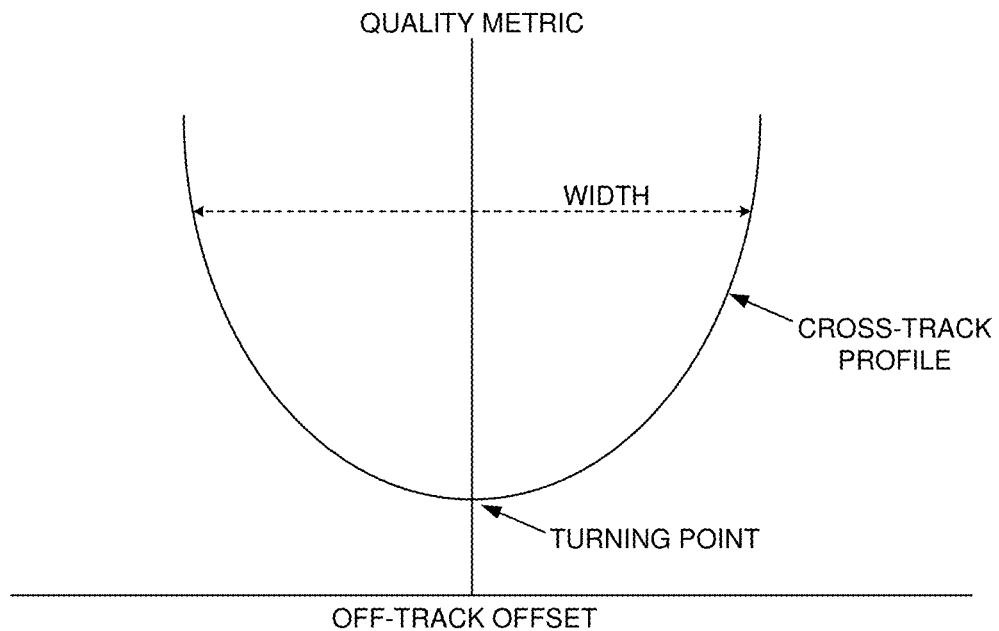
FIGS. 3A and 3B show an embodiment wherein a cross-track profile of each data segment of the target data track is generated and used to measure the track pitch at each data segment.
Figure 3B:
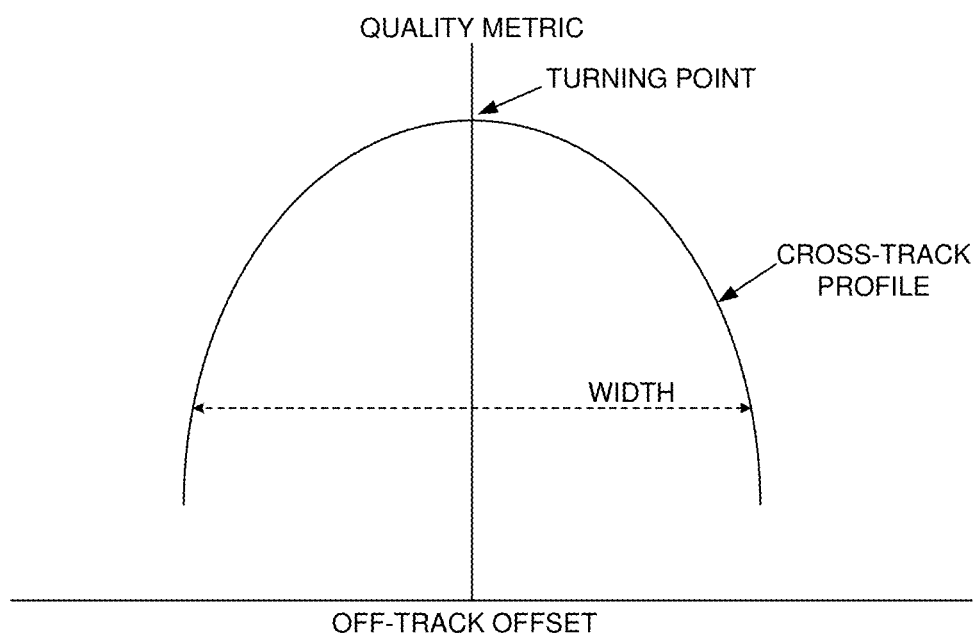

Any suitable technique may be employed to estimate the track pitch of an uncompensated data segment such as shown in FIG. 2C. In one embodiment, after writing the second, overlapping data segment, a quality metric is measured for at least two off-track offsets of the first data segment. That is, the head 16 is positioned at an off-track offset (relative to the uncompensated target track center) in order to measure a quality metric of the resulting read signal. As shown in FIGS. 3A and 3B, the quality metric changes (increases/decreases) as the off-track offset increases and the quality of the resulting read signal decreases. Any suitable quality metric may be measured, such as a sector error rate (SER) which represents a number of bits (or symbols) in error after processing the read signal with a suitable sequence detector (e.g., a Viterbi detector). In this embodiment, the quality metric (e.g., number of errors) increases as the off-track offset increases as shown in FIG. 3A due to the lower quality of the read signal. Another example quality metric may include a signal-to-noise ratio (SNR) metric measured for the read signal, wherein the SNR metric decreases as the off-track offset increases as shown in FIG. 3B. In one embodiment, the width of the cross-track profile such as shown in FIG. 3A may be defined relative to when the measured quality metrics exceed a threshold.

In one embodiment, the target track pitch of the shingled data tracks may be determined by generating a similar cross-track profile as shown in FIG. 3A wherein the measured quality metric may be a sector failure rate (SFR) which represents a number of times a data sector fails a read operation at an off-track offset. That is at each off-track offset, the control circuitry 20 attempts to recover each data sector of the data track (e.g., using full Viterbi plus LDPC decoding of a reach channel), wherein the SFR metric may represent a number of times each sector fails out of a predetermined number of attempts to read each data sector (e.g., over multiple disk revolutions). As the off-track offset increases, the SFR metric for each data sector increases due to the lower quality of the read signal. This embodiment is understood with reference to FIG. 4A which shows the AC track squeeze of the data sectors around a full data track while shingle writing two adjacent data tracks at a narrowing track pitch. At each track pitch, an SFR cross-track profile is generated such as shown in FIG. 3A for each data sector of the first uncompensated data track (wherein in FIG. 4A, the middle of the darker shade represents the bottom of the SFR cross-track profile). The track pitch is incrementally reduced and the average width of the average SFR cross-track profile around the first data track (referred to as the average off-track read capability (OTRC)) is measured and correlated with track pitch as shown in FIG. 4C. A target track pitch (TP) is then selected as the track pitch that corresponds to a target average OTRC as shown in FIG. 4C. In one embodiment, a target track pitch may be determined for each of a plurality of zones defined across the radius of the disk by performing the above measurements for two adjacent data tracks within each zone. That is, the data tracks of each zone are shingle written at a target track pitch corresponding to a target average OTRC as described above.

In one embodiment, measuring an SFR metric for each data sector in each data track of a zone in order to estimate the uncompensated track pitch of each data sector may be prohibitively time consuming due to the multiple disk revolutions needed to measure the SFR metric at each off-track offset. Accordingly in one embodiment, when estimating the uncompensated track pitch of each data sector of a data track, an SER metric may be generated at each off-track offset. In one embodiment, the SER metric for a data sector may be generated over a single revolution of the disk at each off-track offset, or generated over multiple revolutions of the disk at each off-track offset and the resulting SER metrics averaged in order to filter out noise. In one embodiment, the number of revolutions needed to generate an accurate SER metric is significantly less than the number of revolutions needed to generate an accurate SFR metric, and therefore the SER metric enables a faster estimation of the track pitch at each uncompensated data sector as compared to generating an SFR metric for each data sector.

FIG. 4B shows a measured SER metric for each data sector of the first uncompensated data track at each of the narrowing track pitches (i.e., the SER metric for each data sector corresponding to the SFR metric shown in FIG. 4A). In one embodiment, the SER metric of each data sector is correlated with the SFR metric to enable the track pitch of each uncompensated data sector to be estimated much faster as compared to generating an SFR metric for each data sector (due to the fewer number of revolutions needed to generate the SER metric).

This embodiment is understood with reference to FIG. 4E which shows a number of SER cross-track profile bottoms (or turning points in FIG. 3A) measured for a number of data sectors at each track pitch of FIG. 4B. As the track pitch is narrowed, the bottom of the SER cross-track profile will shift by an off-track offset toward the non-overlapping side of the data track (toward the top of the first data track shown in FIG. 2C). An example of a shifting bottom of a cross-track profile is described below with reference to FIG. 7A. An OTRC is also measured for each data sector at each track pitch and correlated with the off-track offset where the bottom of the SER cross-track profile occurs as shown in FIG. 4E. In this manner, the SER cross-track profile bottom may be estimated for any given data sector of any given data track within a zone, and used to estimate the corresponding OTRC using FIG. 4E and corresponding track pitch using FIG. 4C. Once the estimated track pitch of an uncompensated data sector is estimated, the delta ($\Delta$) between the estimated track pitch and the target track pitch may be generated (as shown in FIG. 4C) and correlated with an off-track offset that will achieve the target track pitch as shown in FIG. 4D. Each off-track offset shown in FIG. 4D corresponds to the off-track offset where the bottom of the average SFR cross-track profile occurs. That is, in one embodiment the bottom of the average SFR cross-track profile will shift toward the non-overlapping side of the data track as the track pitch decreases. Accordingly, for each narrowing track pitch and corresponding delta ($\Delta$) from the target track pitch, a corresponding off-track offset that achieves the target track pitch may be generated for each uncompensated data sector using the relationship of FIG. 4D, thereby generating a track trajectory for writing the adjacent, overlapping data track. That is, the adjacent, overlapping data track (second data track of FIG. 2D or FIG. 2F) is written along the track trajectory to achieve a substantially constant (target) track pitch for the data sectors in the overlapped data track (first data track in FIG. 2D or FIG. 2F).

Figure 5A:
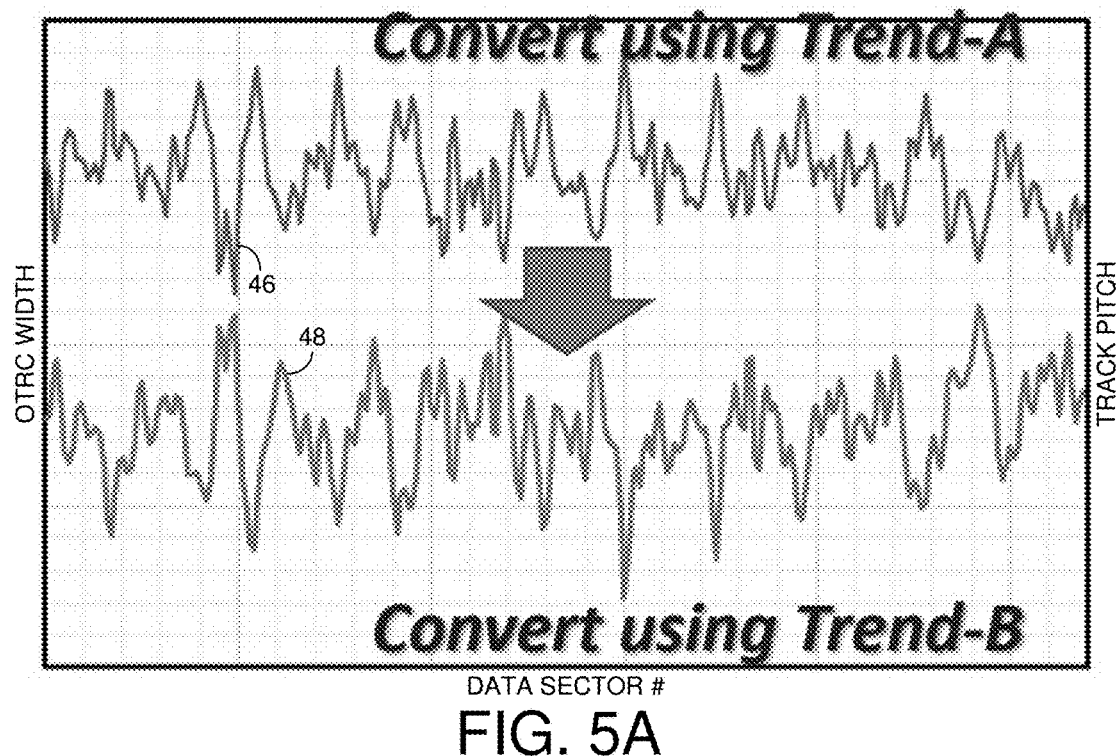
FIGS. 5A and 5B show an embodiment for generating the track trajectory of a target data track.
Figure 5B:
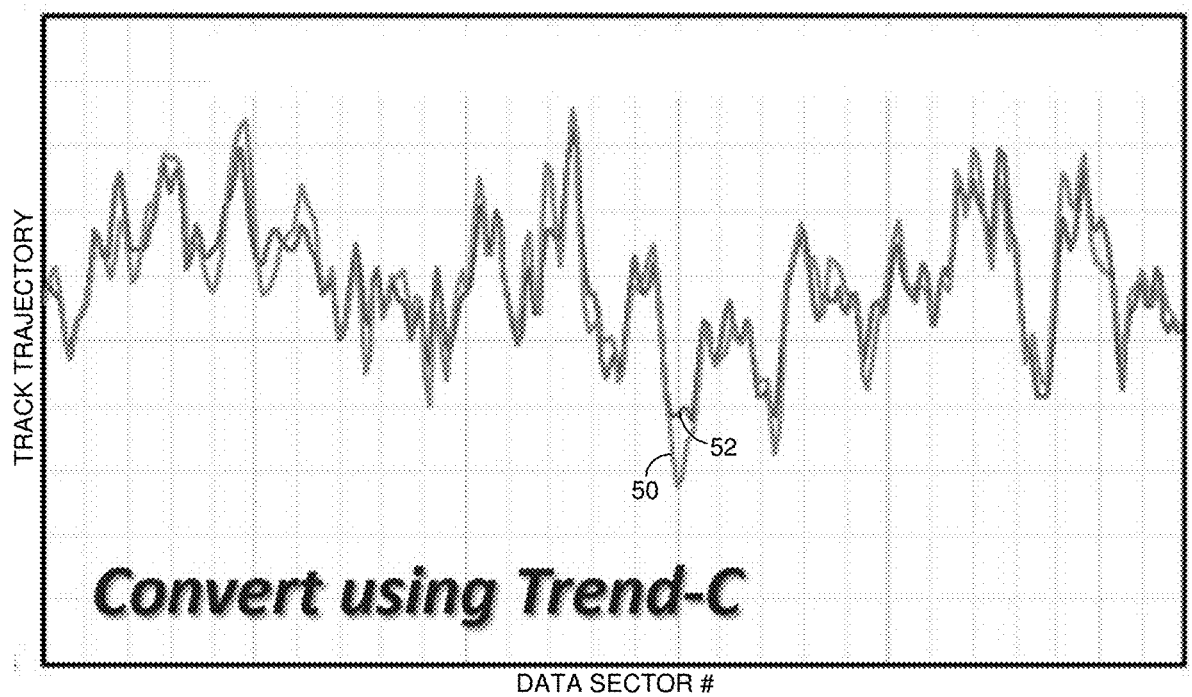

To summarize the above process, the three trends shown in FIGS. 4C, 4D and 4E are first established by generating the SFR and SER cross-track profiles for each data sector of a target data track in a target zone (after having been shingle written by an adjacent data track). Once the three trends are established, only the SER cross-track profile needs to be generated (or estimated in an embodiment described below) for each uncompensated data sector in each data track of the zone. The bottom of the SER cross-track profile for each data sector may then be transformed into a corresponding value (off-track offset) of the track trajectory used to write the adjacent data track. An example of this embodiment is shown in FIG. 5A, wherein the top graph 46 represents the estimated OTRC of each uncompensated data sector of a target data track as converted using Trend A (FIG. 4E), and the bottom graph 48 represents the estimated track pitch for each uncompensated data sector as converted using Trend B (FIG. 4C). FIG. 5B shows the resulting track trajectory 50 (off-track offsets) as converted using Trend C (FIG. 4D) for writing the adjacent data track (the second graph 52 in FIG. 5B is the off-track offset of the SER cross-track profile bottom for each data sector). In an embodiment described in greater detail below, the track trajectory for writing the adjacent data track is also saved and used as the track trajectory for reading the target data track (the first data track in FIG. 2D or FIG. 2F).

Any suitable quality metric may be measured to generate the cross-track profile (such as shown in FIG. 3A or FIG. 3B) and the corresponding track trajectory for each data segment of a data track. FIGS. 6A-6F show an embodiment wherein the quality metric measured to generate the cross-track profile includes a signal-to-noise ratio (SNR) metric of the read signal. In the embodiment of FIG. 6A, the SNR metric is generated by writing a first frequency test pattern (e.g., a 2T pattern) to a data track N−1, writing a second frequency test pattern (e.g., a 5T pattern) to a target data track N, and writing a third frequency test pattern (e.g., a 3T pattern) to a data track N+1. The SNR metric for a data segment of the target data track N is then generated by reading the data segment and processing the resulting read signal to compute:

$$SNR=[Amp_{5T}]/sqrt([Amp_{4.5T}]^2+[Amp_{2T}]^2+[Amp_{3T}]^2)$$

where $Amp_{2T}$ represents the amplitude of the read signal at the 2T frequency component, $Amp_{3T}$ represents the amplitude of the read signal at the 3T frequency component, $Amp_{4.5T}$ represents the amplitude of the read signal at the 4.5T frequency component (narrow band noise), and $Amp_{5T}$ represents the amplitude of the read signal at the 5T frequency component. The above frequency components may be extracted from the read signal in any suitable manner, such as with a digital pass-band filter or by computing a Fourier transform at each frequency. FIG. 6B shows example SNR cross-track profiles for a number of the data segments of a target data track, and for incrementally narrower track pitches. FIG. 6B illustrates in this embodiment how the peak of the cross track profile shifts (by an off-track offset) as the track pitch decreases. This shift in the peak of the cross-track profile is correlated with the measured OTRC for each data segment as shown in FIG. 6F which is similar to correlating the shift of the bottom of the SER cross-track profile with the measured OTRC as shown in the embodiment of FIG. 4E. Similar to the embodiment described above, once the three trends (FIGS. 6D, 6E and 6F) are generated for a zone, the track trajectories for the data tracks of the zone may be generated by measuring the off-track offset of the peak in the SNR cross-track profile for each data segment, and then transforming the measurement into a corresponding off-track offset of the track trajectory.

Figure 7A:
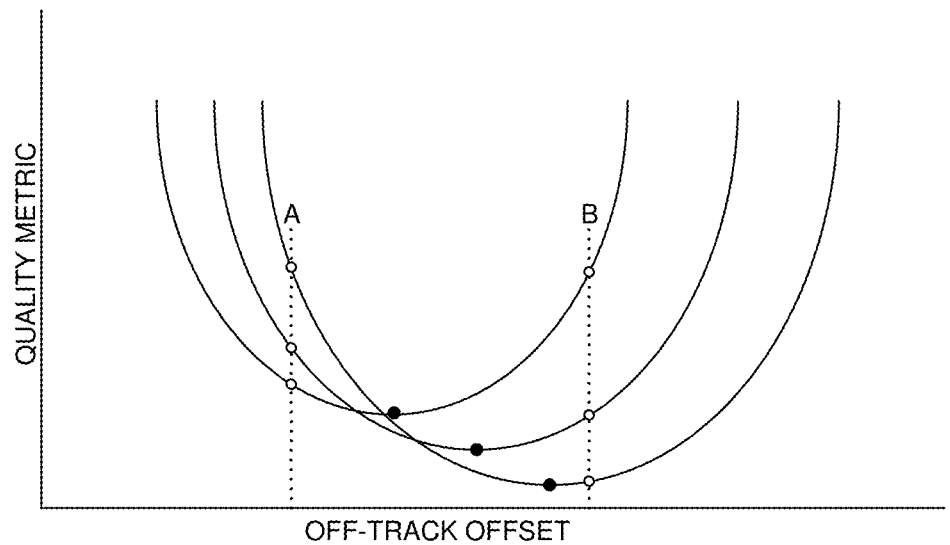
FIG. 7A shows an embodiment wherein turning point of the cross-track profile is estimated by curve fitting the quality metrics measured at two off-track offsets of a data segment.

In one embodiment, the cross-track profile of a data segment (such as shown in FIG. 3A or 3B) may be generated using brute force by measuring a quality metric at a number of off-track offsets across the target data track. In another embodiment, the quality metric may be measured at fewer off-track offsets, and then the measured quality metrics curve fitted to a cross-track profile based on predetermined, nominal cross-track profiles (or functions representing the nominal cross-track profiles). FIG. 7A shows an example of this embodiment, wherein the quality metric may be measured at two off-track offsets (offset A and B), and then curve fitting the resulting two quality metrics to generate a corresponding cross-track profile. In this embodiment, the cross-track profile may be generated over two disk revolutions to measure the two quality metrics as the two off-track offsets A and B. In another embodiment, the head 16 may comprise two radially offset read elements such that the two quality metrics at the two off-track offsets A and B may be measured over a single disk revolution.

Figure 7B:
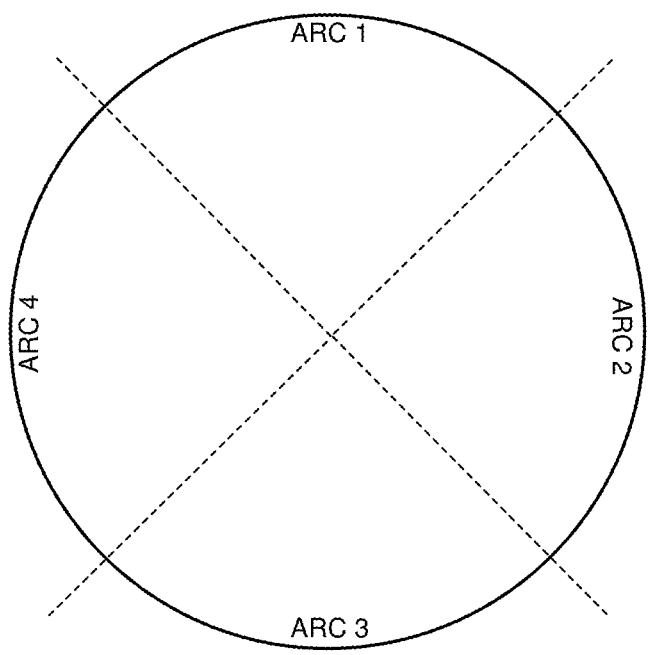
FIG. 7B shows an embodiment wherein different curve fitting functions are used to estimate the turning point of the cross-track profile depending on the circumferential location of the data segment around the target data track.

In one embodiment, the predetermined, nominal cross-track profiles used for curve fitting the quality metrics may vary depending on the circumferential location of the data segments around a data track. Accordingly in an embodiment shown in FIG. 7B, the circumference of the disk may be divided into multiple arcs, wherein predetermined, nominal cross track profiles may be generated for each arc and used to curve fit the measured quality metrics of a data segment within each arc.

In the embodiments described above, the turning point of the cross-track profile (e.g., SER bottom or SNR peak) is correlated with the OTRC of the data segment. In other embodiments, a different parameter of the cross-track profile may be correlated with the OTRC of the data segment, such as correlating the width of the cross-track profile with the OTRC.

In one embodiment, the track trajectory for each data track may be generated during a manufacturing procedure of the disk drive before the disk drive is deployed in the field. In another embodiment, the track trajectory for each data track may be generated after the disk drive has been deployed in the field as part of normal write operations. An example of this embodiment is shown in the table of FIG. 8, wherein the first column of the table represents a step of write operations, the middle columns represent a write/read operation of a data track, and the last column indicates when the track trajectory (read/write) are generated for each data track. The steps of the write operation are as follows:

Step 1: write test pattern to data track 0;
Step 2: write dummy pattern to data track 1 overlapping data track 0 at a target track pitch;
Step 3: read the test pattern from the data sectors in data track 0 in order to measure the cross track profiles and generate the corresponding track trajectory (write trajectory for track 1 and read trajectory for track 0);
Step 4: write test pattern to data track 1;
Step 5: write dummy pattern to data track 2 overlapping data track 1 at the target track pitch;
Step 6: read the test pattern from the data sectors in data track 1 in order to measure the cross track profiles and generate the corresponding track trajectory (write trajectory for track 2 and read trajectory for track 1);
Step 7: write customer data (user data) to data track 0 using the write trajectory generated at Step 3;
Steps 8+: repeat the above steps for the remaining data tracks.

Figure 9:
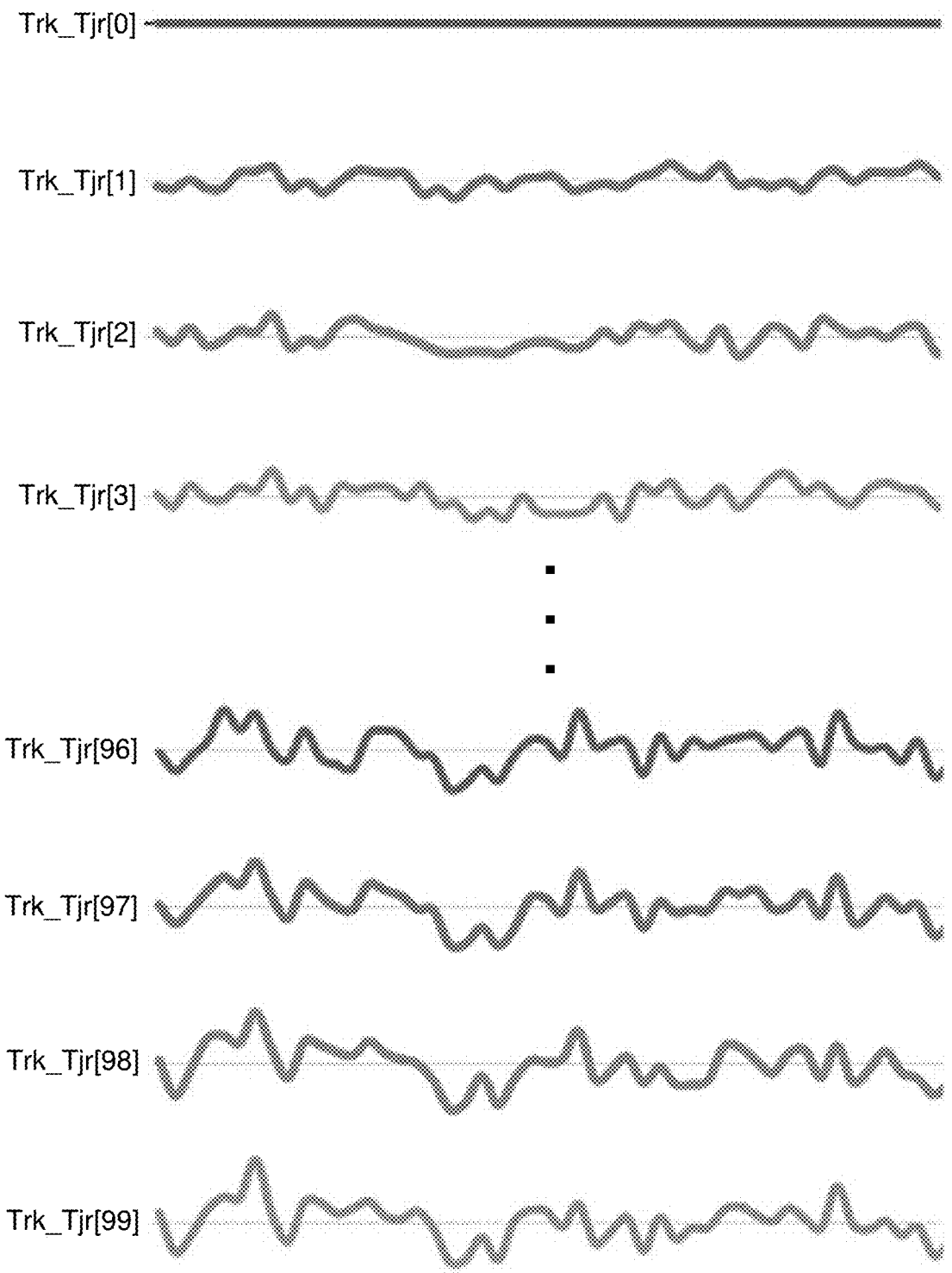
FIG. 9 shows an embodiment wherein the off-track deviations of the track trajectories propagate from track to track.

In one embodiment, the off-track offsets of a track trajectory generated for data track N are propagated when generating the track trajectory for the next adjacent data track N+1. This embodiment is illustrated in FIG. 9 which shows example track trajectories generated for a zone comprising 100 data tracks and the corresponding increase in the AC amplitude of the track trajectories due to the propagating off-track offsets. In one embodiment, the maximum AC amplitude of the track trajectories may be limited so as to suppress a divergence condition by introducing a small scaling factor $\varepsilon$ to each off-track offset when generating a track trajectory:

$$\text{Trk\_Trj}[N+1] = \text{Trk\_Trj}[N]_{DC} + TP + (1-\varepsilon) * \text{Trk\_Trj}[N]_{AC}$$

where $\text{Trk\_Trj}[N+1]$ represents the write track trajectory generated for data track N+1, $\text{Trk\_Trj}[N]_{DC}$ represents the DC component of the write track trajectory generated for data track N, TP represents the target track pitch, and $\text{Trk\_Trj}[N]_{AC}$ represents the AC component of the write track trajectory generated by processing data track N. Any suitable scaling factor $\varepsilon$ may be employed, such as ($\varepsilon=0.05$), and in one embodiment the scaling factor may be adaptively adjusted based on the amplitude of the AC component of the write track trajectories generated for the data tracks (e.g., adaptively increase the scaling factor $\varepsilon$ proportional to the amplitude of the AC component).

In one embodiment, the calibration procedure for generating the three trends described above with reference to FIGS. 4C-4E or FIGS. 6D-6F may be repeated by rewriting the target and adjacent data track at each narrowing track pitch. The resulting three trends generated for each iteration may then be averaged to generate a final, more accurate three trends. In another embodiment, the procedure for measuring the cross-track profile of the data sectors of a target track may be repeated (by rewriting the target and adjacent data tracks) and the resulting track trajectories averaged. In yet another embodiment, when rewriting the adjacent data track, the previously generated track trajectory may be used to rewrite the adjacent data track. That is, the track trajectory may be incrementally adjusted for each rewrite operation so that the track trajectory may converge to a more accurate final trajectory. In one embodiment, rewriting the data tracks in order to average or adapt to the final track trajectory helps filter out non-repeatable runout (NRRO) from the cross-track profile measurement.

FIG. 10 shows a closed loop control system according to an embodiment for controlling the VCM 42 so that the head 16 follows the track trajectory during write/read operations. A position 54 of the head is measured and subtracted from a reference position 56 to generate a position error signal (PES) 58. The PES 58 is filtered using any suitable compensation algorithm 60 to generate the control signal 40 applied to the VCM 42. The reference position 56 represents the write/read track trajectory described above and is generated by adding repeatable runout (RRO) values 62 to a target position 64, wherein the RRO values 62 correspond to the AC component (off-track offsets) of the track trajectory generated for the target data track as described above. In one embodiment, the off-track offsets (e.g., FIG. 4D) for generating the track trajectory correspond to an output response of the VCM 42 in the closed loop control system of FIG. 10. Accordingly, in one embodiment in order to generate the RRO values 62 the off-track offsets (e.g., FIG. 4D) are transformed into values at the input of the compensator 60 by filtering the off-track offsets with a sensitivity function of the closed loop control system. In one embodiment, the off-track offsets of the track trajectory may also be phase shifted (e.g., using an interpolation filter) so as to align with the sample phase and sample rate of the servo sectors $34_1$-$34_N$.

Figure 12A:
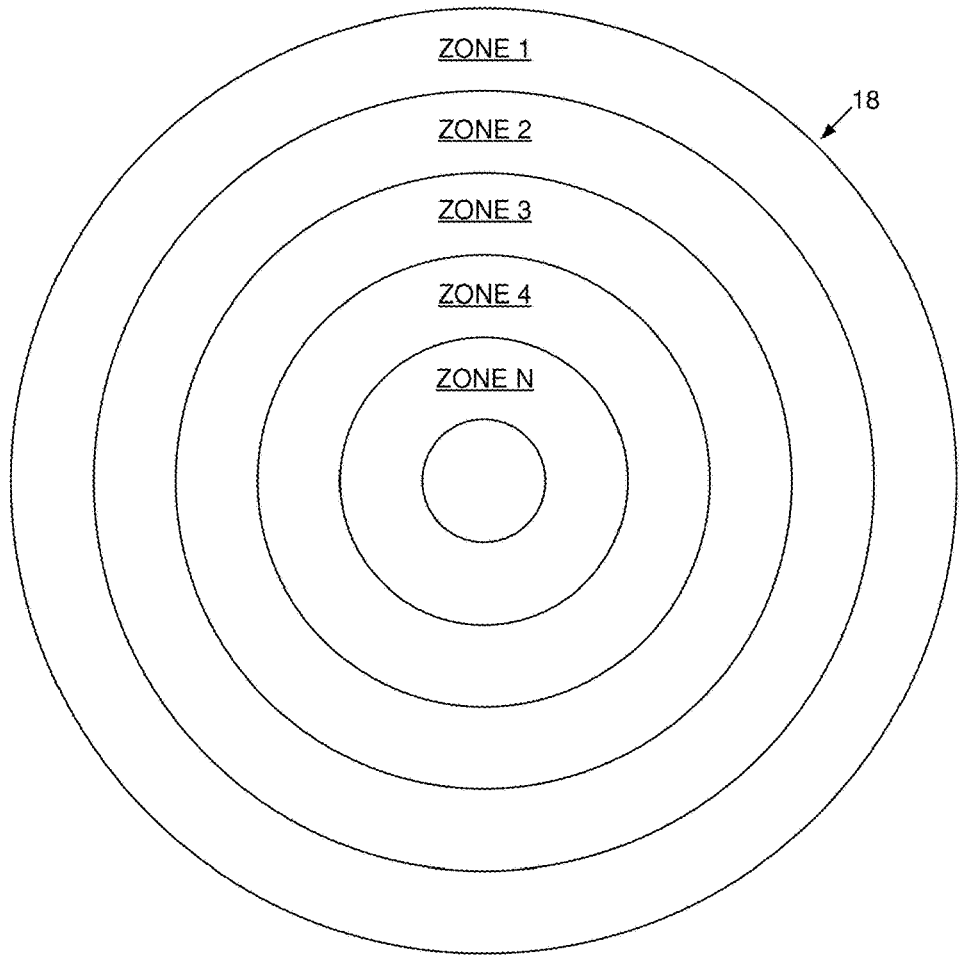
FIG. 12A shows an embodiment wherein a disk surface may comprise a number of zones, wherein each zone comprises a radial band of data tracks.
Figure 12B:
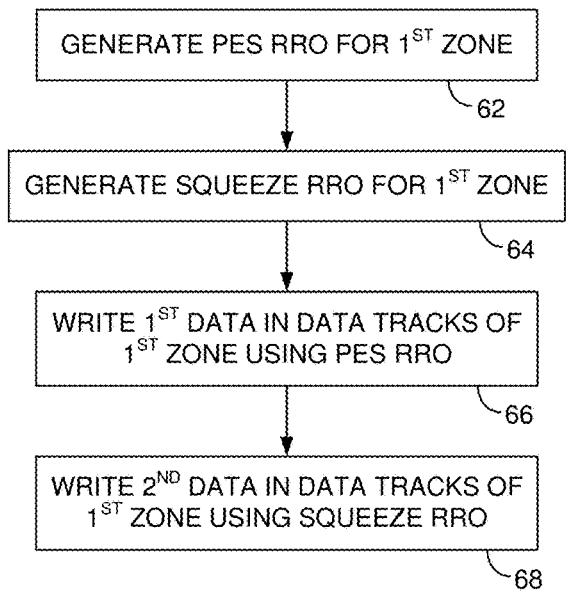
FIG. 12B is a flow diagram according to an embodiment wherein a zone may be non-shingle written using PES RRO and later shingle written using data sector squeeze RRO.

In one embodiment, the disk 18 is divided into a plurality of zones such as shown in FIG. 12A, wherein each zone comprises a plurality of data tracks. FIG. 12B is a flow diagram according to an embodiment wherein PES RRO values are generated based on the servo data in a first zone (block 62), and data sector squeeze RRO values are generated based on data segments in the first zone (block 64). First data is written to the data tracks of the first zone according to a non-shingled data track format for the first zone based on the PES RRO values (block 66). The first data is overwritten with second data according to a shingled data track format based on the data sector squeeze RRO values (block 68).

FIG. 11A shows an example of a number of data tracks of a first zone written according to a non-shingled data track format based on PES RRO values, and FIG. 11B shows a number of data tracks of the first zone written according to a shingled data track format based on data sector squeeze RRO values. The PES RRO values in FIG. 11A are generated based on the PES 58 of the closed loop control system of FIG. 10 using any well known technique. The data sector squeeze RRO values in FIG. 11B are generated based on the estimated track pitch of each data sector after shingle writing a second data track over a first data track as described above. In the example of FIG. 11A, the width (track pitch) of the data tracks equals the width of the servo tracks. However in other embodiments, the track pitch of a non-shingled data track format may be greater than or less than the track pitch of the servo tracks.

In one embodiment, each zone in the example of FIG. 12A may be formatted and accessed according to either a non-shingled data track format or a shingled data track format. When formatted according to a non-shingled data track format, the RRO values 62 in FIG. 10 used to define the track trajectory (reference position 56) are the PES RRO values such as shown in FIG. 11A. When formatted according to a shingled data track format, the RRO values 62 in FIG. 10 used to define the track trajectory (reference position 56) are the data sector squeeze RRO values such as shown in FIG. 11B. In one embodiment shown in FIG. 13A, the control circuitry may dynamically configure the formatting of each zone into a non-shingled data track format or a shingled data track format. In one embodiment, the capacity of the shingled data track format is larger than the non-shingled data track format due to the increase in the number of data tracks (decrease in track pitch) that is achieved due to overlapping the data tracks as shown in FIG. 11B.

Figure 13A:
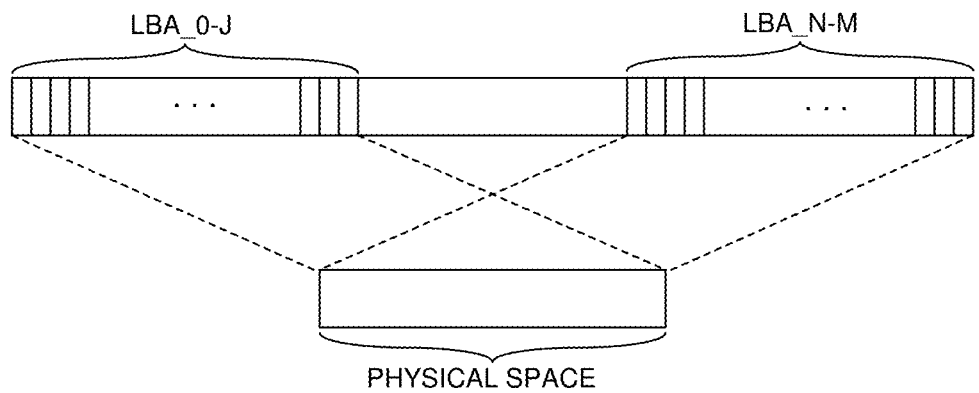
FIG. 13A shows an embodiment wherein the logical block addressing (LBA) of a zone of data tracks may be dynamically configured into a non-shingled or shingled data track format.

In an embodiment shown in FIG. 13A, logical block addresses (LBAs) are mapped to the physical data sectors of a zone depending on how the zone if formatted. When the zone is formatted according to a first data track format based on the PES RRO (e.g., a non-shingled data track format), LBAs 0-J are mapped to the physical data sectors of the zone, and when the zone is formatted according to a second data track format based on the data sector squeeze RRO (e.g., a shingled data track format), LBAs N-M are mapped to the physical data sectors of the zone (where the number of LBAs of the shingled data track format is significantly greater than the number of LBAs of the non-shingled data track format). In one embodiment, dynamically adjusting the LBA address range is implemented using a prior art protocol referred to as Dynamic Hybrid Shingled Magnetic Recording (DHSMR) which enables the host to access a disk drive that is implementing a dynamic adjustment of the LBA address range.

Figure 13B:
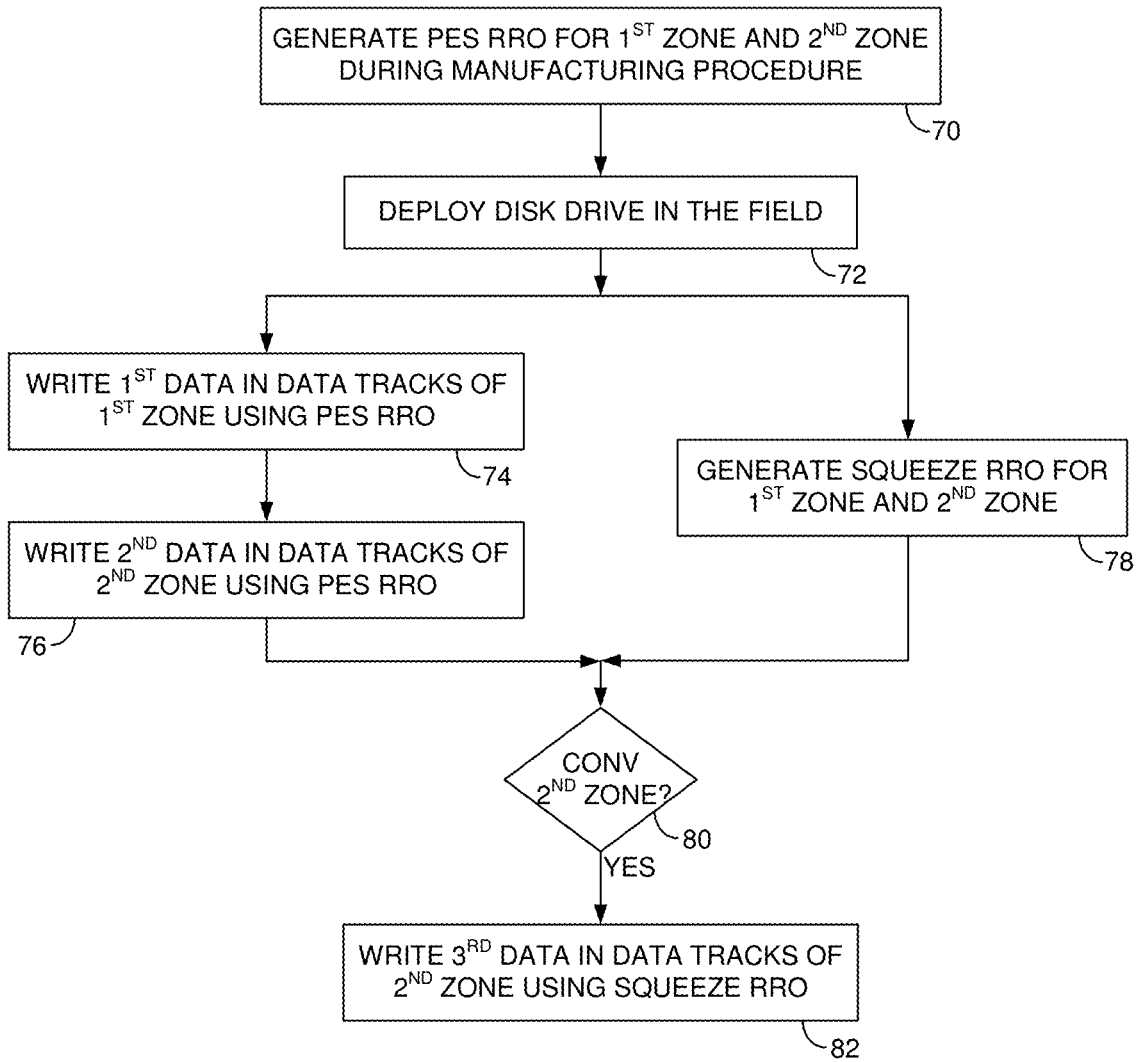
FIG. 13B is a flow diagram according to an embodiment wherein PES RRO may be generated for at least two zones of data tracks during a manufacturing procedure, and data sector squeeze RRO may be generated for the zones while the disk drive is deployed in the field.

FIG. 13B is a flow diagram according to an embodiment wherein during a manufacturing procedure PES RRO is generated for a plurality of the zones (such as shown in FIG. 12A) and the zones formatted according to first data track format (block 70). The disk drive is then deployed in the field, for example, shipped to a designated customer (block 72). When the disk drive is first powered on, the control circuitry communicates to the host an available LBA address range which corresponds to the zones initially formatted at block 70 (which in one embodiment may be all of the zones on the disk). The disk drive services host write commands by writing data to the formatted zones, such as writing data to a first zone using the corresponding PES RRO (block 74), or writing data to a second zone using the corresponding PES RRO (block 76). During an idle time of the disk drive, the control circuitry generates data sector squeeze RRO values for at least two of the zones (block 78) and generates a second data track format for the zones based on the data sector squeeze RRO as described above. Once the data squeeze RRO has been generated and the second data track format generated for the corresponding zone, the control circuitry communicates to the host the availability of an extended LBA address range for the zone such as shown in FIG. 13A. When the control circuitry receives a command from the host to convert a zone to the second data track format (block 80), the control circuitry begins writing data to the corresponding zone using the data sector squeeze RRO values. In one embodiment, the control circuitry may receive a command from the host to convert a SMR zone back into the first data track format, in which case the control circuitry begins writing data to the reformatted zone using the PES RRO values.

In one embodiment, a host may transmit a command at block 80 of FIG. 13B to convert a zone into the second data track format before the control circuitry finishes generating the data sector squeeze RRO values for the zone. In this embodiment, when a write command is received from the host to write data to a data track of the zone, the control circuitry may execute the write command by generating the data sector squeeze RRO values for the data track and then writing the data to the first data track (e.g., as described above with reference to FIG. 8). In one embodiment, the control circuitry may communicate a status of a zone to the host, including a "cold" status meaning that no data sector squeeze RRO values have been generated for the zone, a "learning" status meaning that at least some (but not all) of the data sector squeeze RRO values have been generated for the zone, or a "hot" status meaning that all of the data sector squeeze RRO values have been generated for the zone. In one embodiment, the host may convert a zone into the second data track format even though the zone may be in the "cold" or "learning" mode. When a write command is directed to a "cold" zone, the host will expect the execution time to increase (throughput to decrease) since the data sector squeeze RRO values are generated on-the-fly during the write operation. When a write command is directed to a "learning" zone, the host will expect the execution time may increase depending on whether the write command is directed to data tracks of the zone with or without pre-generated data sector squeeze RRO values.

Figure 13C:
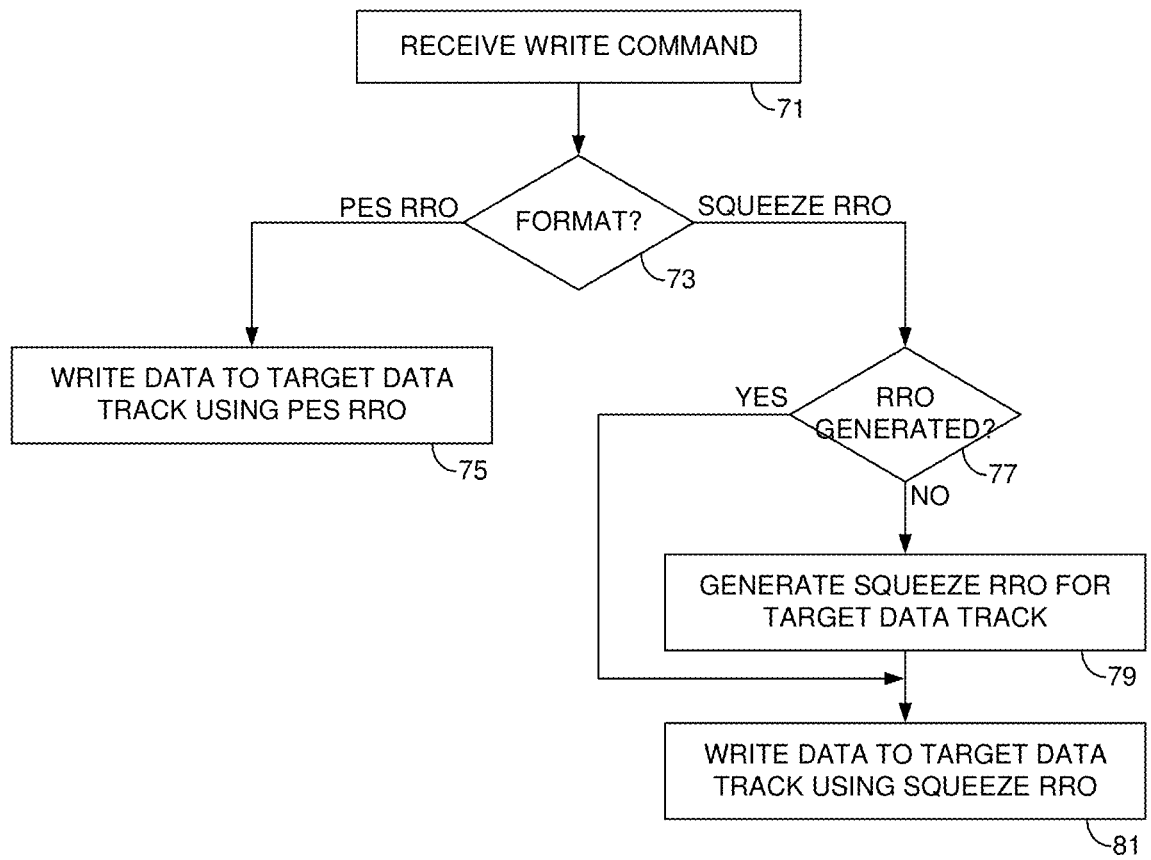
FIG. 13C is a flow diagram according to an embodiment wherein when during a write operation, the data sector squeeze RRO values may be generated on-the-fly for the target data track.

FIG. 13C shows an example of this embodiment, wherein when a write command is received to write data to a target data track (block 71), the current data track format for the target data track is checked (block 73). When the target data track is formatted based on the PES RRO, the data is written to the target data track using the PES RRO (block 75). When the target data track is formatted based on the data sector squeeze RRO, and the data sector squeeze RRO values have not been generated (block 77), the data sector squeeze RRO values are generated on-the-fly as part of the write operation (block 79). Once the data sector squeeze RRO values have been generated (or if they were previously generated), the data is written to the target data track using the data squeeze RRO values (block 81).

In one embodiment, the PES RRO values and the data sector squeeze RRO values are stored in a non-volatile memory so they may be used during write/read operations by the closed loop control system such as shown in FIG. 10. In one embodiment, either or both of the RRO values may be written in a wedge RRO field of each servo sector. Example techniques for storing RRO values in a wedge RRO field are disclosed in U.S. Pat. No. 6,657,810 entitled "DISK DRIVE EMPLOYING SEPARATE READ AND WRITE REPEATABLE RUNOUT ESTIMATED VALUES FOR A HEAD HAVING A READ ELEMENT OFFSET FROM A WRITE ELEMENT" and U.S. Pat. No. 8,693,134 entitled "ALTERNATING WEDGE REPEATABLE RUNOUT (WRRO) PATTERN" the disclosures of which are incorporated herein by reference. In another embodiment, one or both of the RRO values may be stored in a non-volatile semiconductor memory, such as a Flash memory. In yet another embodiment, the PES RRO values may be stored in a wedge RRO field of the servo sectors, and the data sector squeeze RRO values may be stored in a dedicated area of each SMR zone (e.g., at the beginning of each SMR zone). When accessing an SMR zone, the data sector squeeze RRO values may be read from the disk (from the SMR zone) into a non-volatile or volatile semiconductor memory (e.g., a dynamic random access memory (DRAM)) and then used during write/read operations.

Figure 14A:
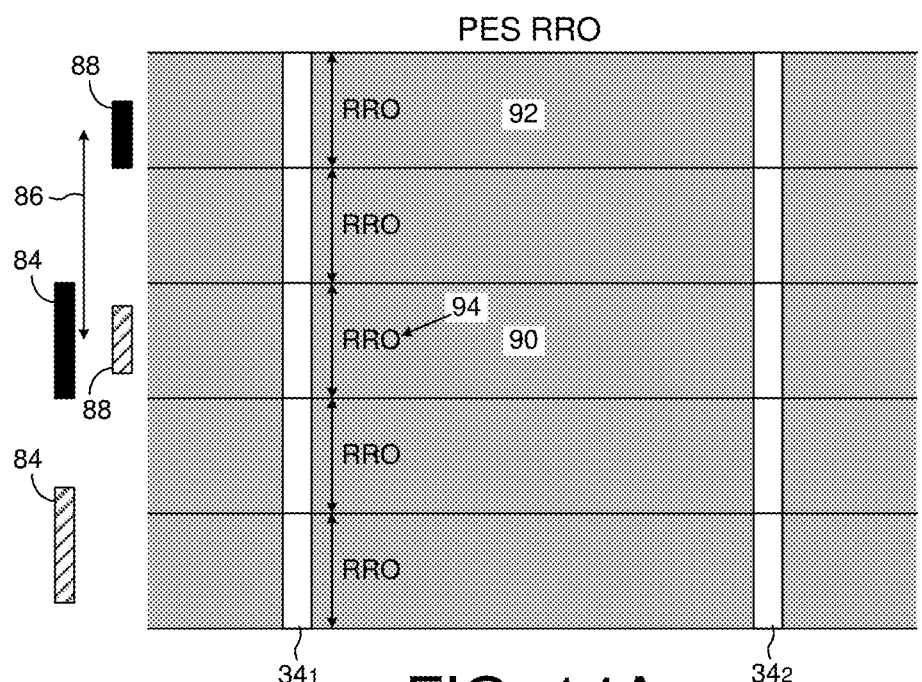
FIG. 14A shows an embodiment wherein first PES RRO is used to generate a first track trajectory used to write a data track and second PES RRO is used to generate a second track trajectory used to read the data track.

FIG. 14A shows an embodiment wherein the head 16 may comprise a write element 84 that is radially offset 86 from a read element 88. When writing data to data track 90 based on a non-SMR data track format, the write element 84 is positioned over data track 90 based on the servo information read by the read element 88 (i.e., based on the servo sectors of data track 92). Accordingly, the PES RRO values used to write data track 90 are generated at the radial location of the read element 88 due to the radial offset 86 between the write element 84 and the read element 88. When reading data track 90, the read element 88 is poisoned over data track 90 as shown in FIG. 14A, and the corresponding PES RRO values 94 generated for data track 90 are used during the read operation (e.g., by the closed loop control system of FIG. 10).

Figure 14B:
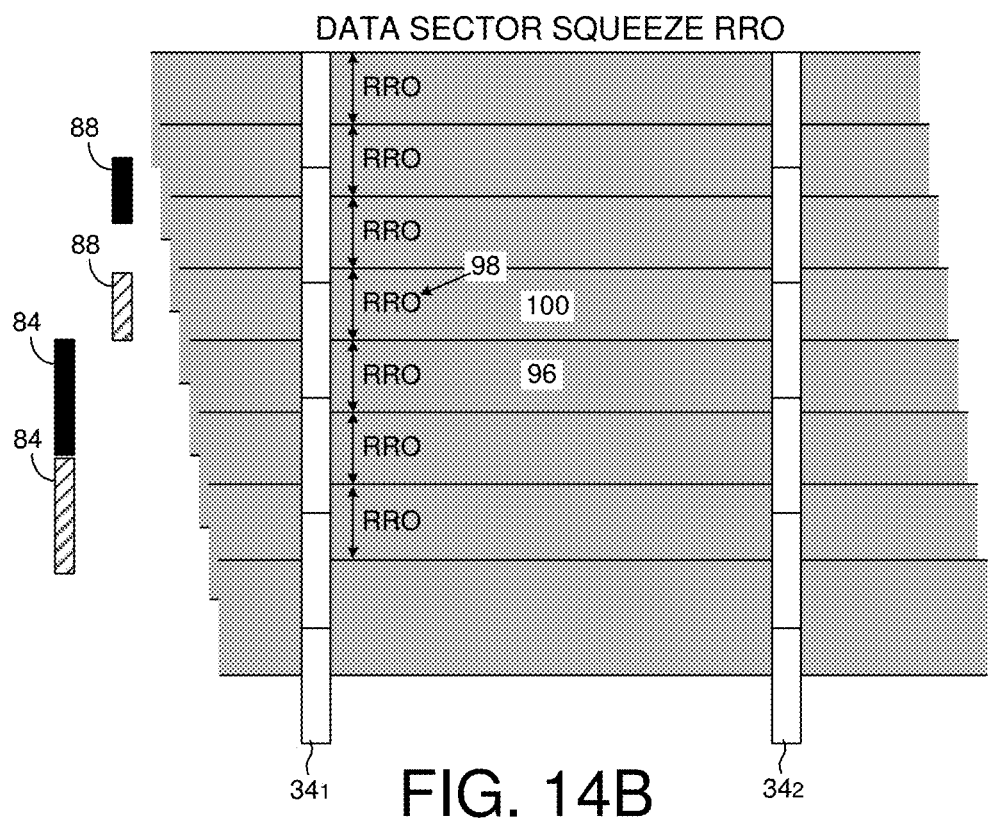
FIG. 14B shows an embodiment wherein data sector squeeze RRO is used to generate a track trajectory used to read a first data track, and used to write a second adjacent (shingle written) data track.

FIG. 14B shows an embodiment wherein when writing data to data track 96 based on a SMR data track format, the data sector squeeze RRO values 98 that were generated for adjacent data track 100 (as described above) are used during the write operation (e.g., by the closed loop control system of FIG. 10). When reading data track 100, the read element 88 is positioned over data track 100 as shown in FIG. 14B, and the data sector squeeze RRO values 98 that were generated for data track 100 are used during the write operation. Accordingly in this embodiment, first data may be read from a first data track 100 based on a track trajectory defined by the data sector squeeze RRO values 98, and second data may be written to a second, adjacent data track 96 based on the same track trajectory defined by the same data sector squeeze RRO values 98.

In the embodiments described above, the data sector squeeze RRO values may be generated at any suitable resolution around a data track. In one embodiment, a data sector squeeze RRO value may be generated for each data sector, or a data sector squeeze RRO value may be generated for a predetermined number of consecutive data sectors. In yet another embodiment, multiple data sector squeeze RRO values may be generated for each data sector. That is, the quality metric (e.g., SER) that is measured to define the cross-track profile such as shown in FIG. 3A may correspond to a single data sector, multiple data sectors, or part of a data sector.

In one embodiment, when accessing an SMR data track the RRO values 62 of the closed loop servo system such as shown in FIG. 10 may be updated at a sample rate that is higher than the servo sector $34_1$-$34_N$ sample rate. That is, in one embodiment the data sector squeeze RRO values may be generated at a higher resolution than the servo sector $34_1$-$34_N$ sample rate, and the higher resolution RRO values used to update the closed loop servo control system so as to further reduce the AC track squeeze around the data track.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk comprising servo data for defining a plurality of data tracks;
    a head actuated over the disk; and
    control circuitry configured to:
        define a plurality of zones for the disk, wherein each zone comprises a plurality of the data tracks;
        generate position error signal (PES) repeatable runout (RRO) values based on the servo data in a first zone;
        generate data sector squeeze RRO values based on data segments in the first zone;
        generate a first data track format for the first zone based on the PES RRO values; and
        generate a second data track format for the first zone based on the data sector squeeze RRO values.

2. The data storage device as recited in claim 1, wherein a radial density of the data tracks defined by the first data track format is lower than a radial density of the data tracks defined by the second data track format.

3. The data storage device as recited in claim 1, wherein the control circuitry is further configured to:
    write first data to the data tracks of the first zone based on the first data track format; and
    overwrite the first data with second data based on the second data track format.

4. The data storage device as recited in claim 1, wherein the control circuitry is further configured to:
    generate the PES RRO values for the first zone during a manufacturing procedure of the data storage device; and
    generate the data sector squeeze RRO values for the first zone while the data storage device is deployed in the field.

5. The data storage device as recited in claim 4, wherein before the control circuitry finishes generating the data sector squeeze RRO values for the first zone, the control circuitry is further configured to communicate to a host a status indicating the first zone is in a learning mode.

6. The data storage device as recited in claim 4, wherein the control circuitry is further configured to:
    receive a write command from a host to write data to a data track of the first zone before the control circuitry finishes generating the data sector squeeze RRO values for the data track; and
    execute the write command by generating the data sector squeeze RRO values for the data track and then writing the data to the data track.

7. The data storage device as recited in claim 1, wherein while the data storage device is deployed in the field, the control circuitry is further configured to:
    write first data to the data tracks of the first zone based on the first data track format;
    during an idle time of the data storage device, generate the data sector squeeze RRO values for the first zone; and
    after generating the data sector squeeze RRO values for the first zone, write second data to the data tracks of the first zone based on the second data track format.

8. The data storage device as recited in claim 7, wherein after generating the data sector squeeze RRO values for the first zone, the control circuitry is further configured to communicate to a host an availability of the first zone to be written using the first data track format or the second data track format.

9. The data storage device as recited in claim 7, wherein the control circuitry is further configured to write the second data to the data tracks of the first zone based on the second data track format after receiving a command from a host to convert the first zone from the first data track format to the second data track format.

10. A data storage device comprising:
    a disk comprising servo data for defining a plurality of data tracks;
    a head actuated over the disk; and
    control circuitry configured to:
        define a plurality of zones for the disk, wherein each zone comprises a plurality of the data tracks;
        generate data sector squeeze repeatable runout (RRO) values based on data segments in a first zone, wherein the data sector squeeze RRO values define a track trajectory;
        read first data from a first data track in the first zone based on the track trajectory; and
        write second data to a second data track in the first zone based on the track trajectory, wherein the first data track is adjacent the second data track.

11. The data storage device as recited in claim 10, wherein the second data track is shingle written to overlap at least part of the first data track.

12. The data storage device as recited in claim 10, wherein the control circuitry is further configured to generate position error signal (PES) RRO values based on the servo data in the first zone, wherein:
    the PES RRO values define a first track trajectory to write a first data track in the first zone and a second track trajectory to read the first data track in the first zone; and the first track trajectory is different from the second track trajectory due to a radial offset between a write element and a read element of the head.

13. The data storage device as recited in claim 10, wherein the control circuitry is further configured to:
   generate the PES RRO values for the first zone during a manufacturing procedure of the disk drive; and
   generate the data sector squeeze RRO values for the first zone while the data storage device is deployed in the field.

14. The data storage device as recited in claim 10, wherein after generating the data sector squeeze RRO values for the first zone, the control circuitry is further configured to communicate to a host an availability of the first zone to be written using a first data track format based on the PES RRO values or using a second data track format based on the data sector squeeze RRO values.

15. A data storage device comprising:
   a disk comprising servo data for defining a plurality of data tracks;
   a head actuated over the disk; and
   a means for defining a plurality of zones for the disk, wherein each zone comprises a plurality of the data tracks;
   a means for generating position error signal (PES) repeatable runout (RRO) values based on the servo data in a first zone;
   a means for generating data sector squeeze RRO values based on data segments in the first zone;
   a means for generating a first data track format for the first zone based on the PES RRO values; and
   a means for generating a second data track format for the first zone based on the data sector squeeze RRO values.

16. The data storage device as recited in claim 15, wherein a radial density of the data tracks defined by the first data track format is lower than a radial density of the data tracks defined by the second data track format.

17. The data storage device as recited in claim 15, wherein:
   the PES RRO values are generated for the first zone during a manufacturing procedure of the data storage device; and
   the data sector squeeze RRO values are generated for the first zone while the data storage device is deployed in the field.

18. The data storage device as recited in claim 17, wherein after generating the data sector squeeze RRO values for the first zone, further comprising a means to communicate to a host an availability of the first zone to be written using the first data track format or the second data track format.

19. The data storage device as recited in claim 15, further comprising:
   a means for reading first data from a first data track of the first zone based on a track trajectory defined by the data sector squeeze RRO values; and
   a means for writing second data to a second data track based on the track trajectory, wherein the first data track is adjacent the second data track.

20. The data storage device as recited in claim 19, wherein the second data track is shingle written to overlap at least part of the first data track.

* * * * *